Aug. 20, 1963       J. H. PARIS       3,101,383
GAS AND LIQUID CONTACT APPARATUS
Filed Jan. 14, 1960
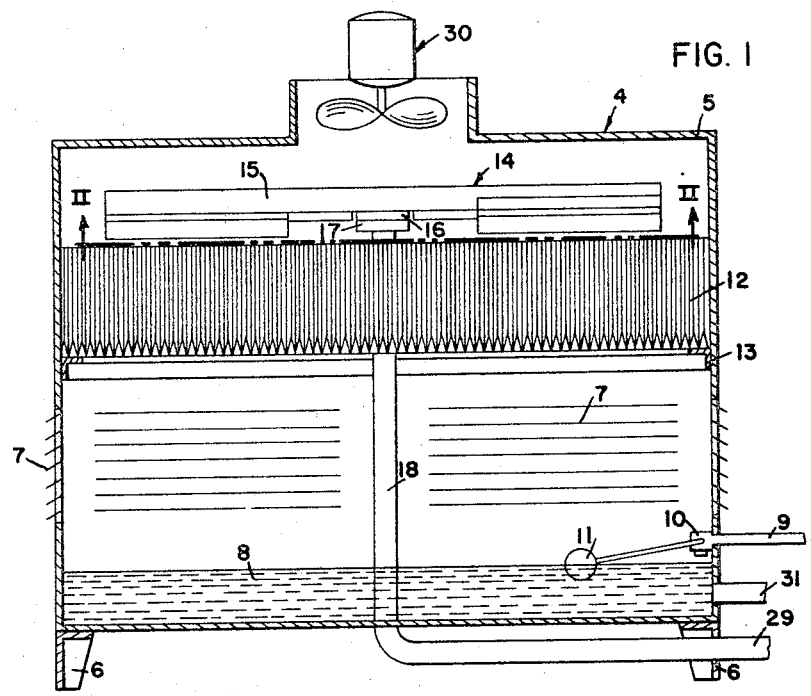
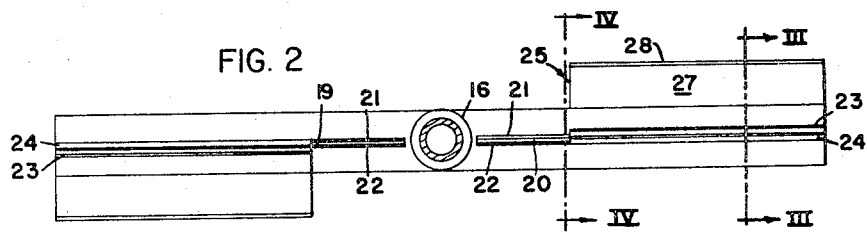
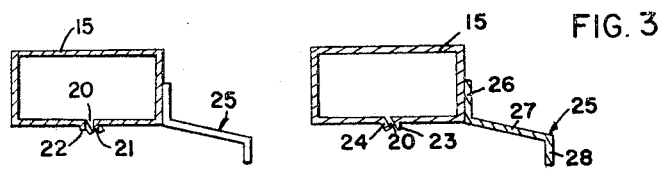
FIG. 4
INVENTOR.
JAMES H. PARIS
BY
*Herman Seid*
ATTORNEY.

3,101,383
GAS AND LIQUID CONTACT APPARATUS
James H. Paris, Kirkville, N.Y., assignor to Carrier Corporation, Syracuse, N.Y., a corporation of Delaware
Filed Jan. 14, 1960, Ser. No. 2,517
4 Claims. (Cl. 261—24)

This invention pertains to gas and liquid contact apparatus and more particularly to an improved liquid distribution system for use in such apparatus.

In Munters Patent 2,809,818, granted October 15, 1957, there is disclosed cooling tower structure including a packing, means for passing gas through the packing, and a rotary sprayer for distributing water over the packing. The packing may be composed of alternate corrugated and plain sheets attached at their points of contact to provide a plurality of adjacent parallel cells of relatively small cross-sectional areas between the flat and undulating folds of the sheets so that liquid can bridge the walls of the cells by surface tension. The bottom of the packing is serrated to break the bridging of liquid. The undulating folds of the corrugated sheets provide the spacing of the partition walls of each cell, and the edge portions of the assembled sheets provide a large area through which liquid enters and leaves the packing. The sheets are preferably composed of paper possessing qualities of high moisture absorbency and a large degree of wet strength. The moisture absorbency increases the effectiveness of the packing in heat transfer.

The rotary sprayer for distributing water over the packing includes a plurality of arms with spaced openings therein. The sprayer subdivides the stream of supply water into droplets which are sprayed over the packing. The droplets discharged from the openings contact the top of the packing and flow downwardly therethrough by gravity, however, many of the smaller droplets discharged from the openings may be caught up in the air stream and discharged from the top of the cooling tower. To remove the smaller droplets suspended in the air stream before it leaves the tower, eliminator plates are often provided in the cooling tower over the rotary sprayer.

The distribution of water over the top surface of the packing will vary with different flow rates, which are determined by the design of the system with which the cooling tower is employed. A mechanical refrigerating system requires more cooled water than an absorption refrigerating system. Under low flow rates the distributor may rotate at a speed adequate to sufficiently and properly wet the surface of the packing to efficiently cool the water flowing therethrough, however, under full flow conditions, the thrust of the water issuing from the openings in the distributor will be large and the distributor may rotate too rapidly and flood liquid on the surface of the packing. Water will drain back to the sump in the bottom of the cooling tower without being cooled, thus diminishing the capacity of the cooling tower.

A primary object of this invention is to provide gas and liquid contact apparatus in which these disadvantages or defects in prior constructions are obviated.

An object of this invention is to provide gas and liquid contact apparatus including an improved rotary liquid distributor having a slot therein to distribute liquid uniformly over the top surface of the packing.

Another object of this invention is to provide gas and liquid contact apparatus including an improved rotary liquid distributor having a baffle thereon to minimize loss of the splashed liquid in the air stream.

Still another object of this invention is to provide gas and liquid contact apparatus having an improved rotary liquid distributor capable of being adjusted to vary the speed of rotation thereof in relation to the liquid flow rate through the distributor.

This invention relates to a gas and liquid contact apparatus and includes in combination, a casing, a packing in said casing comprised of a series of closely spaced wall members defining cells open at the top and bottom, the cross-sectional areas of said cells being so small that liquid can bridge the walls of the cell by surface tension, said packing including means for breaking the bridging of liquid, means for passing a gas stream through said packing, and means for distributing a liquid over said packing comprising a liquid distributing tube rotatably mounted above said packing, said tube having an elongated slot therein, a portion of said slot directing liquid downwardly with respect to the tube, and a portion of the slot directing the liquid at an angle with respect to a vertical plane through the tube, the reactive force of liquid discharging from the latter portion causing rotation of said tube, and baffle means on said tube to redirect splashing liquid onto the top surface of said packing.

The attached drawings, in which like reference numerals denote like parts throughout the several views, disclose a preferred embodiment of the invention in which:

FIGURE 1 is an elevational view partly in section of a cooling tower embodying the present invention;

FIGURE 2 is a bottom view of the improved rotary sprayer taken along line II—II of FIGURE 1;

FIGURE 3 is a transverse sectional view of the improved rotary sprayer taken along line III—III of FIGURE 2; and FIGURE 4 is a transverse sectional view of the improved rotary sprayer taken along line IV—IV of FIGURE 2.

Referring to the drawings, there is disclosed in FIGURE 1 a cooling tower embodying the present invention. Cooling tower 4 includes a casing 5 carried on support members 6. Along the lower portion of the casing and extending substantially around the entire casing are suitable louvers 7 which permit air to pass into the lower portion of the casing. In the bottom of the casing is located a suitable sump 8 wherein liquid may be collected. The liquid level in the sump is maintained at a desired height by means of a supply line 9 in which is connected a suitable valve 10 operated by float 11 in the sump. Packing 12, preferably of the type disclosed in Munters Patent No. 2,809,818, is mounted above sump 8 and louvers 7, and is supported by angle irons 13 which are secured to the inside of casing 5.

Above the packing is mounted my novel water distributor 14. In the preferred embodiment this water distributor comprises a rectangular tube 15 closed at the ends and having a hub 16 secured centrally to the bottom of said tube. Hub 16 is rotatably secured to riser pipe 18 by bearing and seal assembly 17. Elongated slots 19 and 20 are formed in the bottom of said tube on each side of hub 16. The bottom walls of the tube adjacent each slot are preferably turned downwardly to form lips or flanges 21 and 22. However, if desired, the lips may by formed separately and then suitably affixed to the bottom of tube 15 adjacent the slot. Lips 21 and 22 extend approximately one-third the length of each slot. The water discharged from between each pair of lips 21 and 22 is discharged downwardly. Adjacent the lips 21 and 22 are lips 23 and 24 which are generally parallel one to the other and extend from the bottom at an angle of from 15° to 75° with respect to a vertical plane passing through the slot. The reactive force of the water discharged from the angled portion of the slot between each pair of lips 23 and 24 causes tube 15 to rotate.

The water flow rate may vary from about one to four gallons per minute per square foot of top surface of packing 12 when the cooling tower is employed with an absorption refrigerating system and from four to seven gallons per minute per square foot when the cooling tower is used with a mechanical refrigerating system.

During full flow conditions the tube 16 will tend to rotate at a relatively high speed due to the reactive force of the water issuing from between lips 23 and 24 and more water than can be effectively cooled will be distributed on the top surface of the packing. During low flow conditions the tube 15 will rotate at a moderate speed to properly distribute the water over the surface of the packing.

To effect a more uniform rotation of tube 15 and to prevent water splash, baffle 25 is suitably secured to tube 15 coextensive with each pair of lips 23 and 24. Each baffle includes a first depending portion 26 connected to tube 15, a secondly outwardly extending portion 27, and a third depending portion 28. The baffle is preferably formed of sheet metal which may be bent along the line connecting the first and second portions to adjust the angle therebetween. The second portion 27 is bent downwardly at an angle with a horizontal plane under full liquid flow conditions to form resistance to the air, thus retarding the speed of rotation of the distributor. Under low flow conditions portion 27 is bent upwardly so that it extends generally horizontally from tube 15. The full force of liquid issuing from between lips 23 and 24 is applied to rotate the tube 15 and the baffle is used only to confine liquid to the surface of the packing. Portion 28 materially assists in confining liquid to the surface of the packing under either full flow or low flow conditions.

Decreasing the length of the angled lips 23 and 24 will decrease the reactive force of water issuing from the slot between said lips, assuming a constant flow rate, and will result in a decreased speed of rotation of the tube. Increasing the length of lips 23 and 24 while maintaining the flow rate constant will increase the reactive force and increase the speed of rotation of the tube.

If the tube rotates too fast, more water is placed on the top of the packing than can be effectively evaporatively cooled and said water overflows the surface of the packing and is returned to the sump without being cooled. When the tube rotates too slowly or stops altogether an insufficient supply of water is discharged over the surface of the packing and the rate of cooling of the water is inadequate to reduce the temperature of the water leaving the cooling tower sufficiently.

As will be apparent, the baffles may be suitably adjusted to control the speed of rotation of distributor 14, dependent upon the water flow rate through the distributor, the length of the angled portion of slots 19 and 20 and the frictional resistance between hub 16 and assembly 17.

Water is introduced into riser pipe 18 through conduit 29 from the place where it is used by suitable pump means, not shown.

Fan means 30 are mounted in the upper portion of casing 5 to draw air through the packing in heat exchange relation with water passing therethrough.

During operation of the cooling tower, fan means 30 will cause air to pass through louvers 7 and be induced through packing 12. Simultaneously water is distributed on the top surface of packing 12 by distributor 14. The water flows through the packing in counterflow relationship to the air stream to effect evaporative cooling of the water. This is done at the cost of evaporating approximately two percent of the water passed through the packing. The water cooled in packing 12 is collected in sump 8 and is discharged therefrom through conduit 31 to the place where it is used. The liquid level is maintained in the sump by means of float-controlled valve 10.

Baffle 25 performs two functions in the operation of the cooling tower. First, the tendency for the water to splash and be caught up in the upwardly moving air stream is resisted by baffle 25 for the splash water is trapped and redeposited on the top of packing 12. Thus the necessity for the eliminator plates commonly used in cooling towers of this type to remove splash water suspended in the air stream discharged from the cooling tower is obviated. Second, the rate of rotation of the tube 15 can be varied by adjusting the portion 27 of baffle 25 upwardly or downwardly. This assures an equal distribution of water over the top surface of packing 12 under varying flow rates.

The slots permit a uniform distribution of water upon each increment of surface area of the packing. Further, the slots can be more easily cleaned of foreign matter and are less subject to clogging than circular openings formed in the rotary distributor.

While I have described a preferred embodiment of the invention it will be understood that the invention is not limited thereto since it may be otherwise embodied within the scope of the appended claims.

I claim:

1. In a gas and liquid contact apparatus, the combination of a casing, a packing in said casing, means for passing an air stream through said packing, and means for distributing water over said packing comprising a liquid distributing tube arranged above the packing and having an elongated continuous slot in the bottom thereof and extending substantially the length of the tube, means for rotatably mounting said tube above said packing, first lip means for directing a part of the water discharged from the slot downwardly in a sheet-like formation, and second lip means placed outwardly from the first lip means on said tube for directing the remainder of the liquid discharged from the slot at an angle to the plane of said first sheet-like formation whereby discharge of liquid through said second lip means rotates said tube, and flexible baffle means substantially coextensive with said second lip means and affixed to the trailing edge of said tube for minimizing the splashing of water from said packing and for adjusting the speed of rotation of said tube.

2. In a gas and liquid contact apparatus, the combination of a packing, means for passing air through said packing and means for distributing water over said packing comprising a tubular member rectangular in cross-section mounted adjacent the top section of said packing, means for rotatably mounting said tube above said packing, said tubular member having a hub connected on the bottom thereof and having a pair of slots formed in the bottom thereof, one on each side of said hub, a water supply pipe, a bearing and seal assembly connecting said hub and supply pipe, each of said slots having a first portion including lip means to direct water downwardly and a second portion including inclined lip means placed outwardly from the first lip means on said tube to direct water at an angle with respect to a vertical plane passing through said member whereby discharge of liquid through said inclined lip means rotates said tube, the reactive force of water discharging from said inclined lip means of the second portion of each of said slots causing the tubular member to rotate and flexible baffle means adjustably connected to said tubular member to redirect splash water onto the surface of said packing and to control the speed of rotation of the member.

3. A gas and liquid contact apparatus according to claim 2 in which the flexible baffle means includes a first upright portion connected to said tubular member substantially coextensive with the second portion of the slot opening at an angle and a second portion extending from the first portion and adjustable with regard thereto to control the speed of rotation of the tubular member.

4. A gas and liquid contact apparatus according to claim 3 in which the baffle means includes a third portion extending downwardly from the end of the second portion to restrict the splashing of water.

(References on following page)

References Cited in the file of this patent

UNITED STATES PATENTS

| | | |
|---|---|---|
| 678,979 | Ridgway | July 23, 1901 |
| 2,029,268 | Lund | Jan. 28, 1936 |
| 2,225,836 | Lund | Dec. 24, 1940 |
| 2,595,702 | Prevost | May 6, 1952 |
| 2,692,163 | Geel | Oct. 19, 1954 |
| 2,809,818 | Munters | Oct. 15, 1957 |
| 2,926,856 | Lawlor et al. | Mar. 1, 1960 |

FOREIGN PATENTS

| | | |
|---|---|---|
| 5,418 | Great Britain | 1915 |
| 112,653 | Great Britain | Jan. 16, 1918 |
| 105,885 | Sweden | Nov. 10, 1942 |